(12) United States Patent
Tuma et al.

(10) Patent No.: US 6,491,741 B2
(45) Date of Patent: Dec. 10, 2002

(54) FILTER ASSEMBLY WITH SHAPED ADSORBENT ARTICLE; AND DEVICES AND METHODS OF USE

(75) Inventors: Daniel L. Tuma, St. Paul, MN (US); Andrew C. Dahlgren, Lantau Island (HK); Vijay Garikipati, Plymouth, MN (US); Randy J. Logan, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/734,424

(22) Filed: Dec. 11, 2000

(65) Prior Publication Data

US 2001/0000381 A1 Apr. 26, 2001

Related U.S. Application Data

(63) Continuation of application No. 09/353,506, filed on Jul. 14, 1999, now Pat. No. 6,168,651, which is a continuation-in-part of application No. 09/168,698, filed on Oct. 8, 1998, now Pat. No. 6,146,446.

(51) Int. Cl.[7] ............................................... B01D 53/04
(52) U.S. Cl. ............................... 95/90; 95/143; 96/135; 96/153; 55/385.1; 55/512
(58) Field of Search ....................... 95/90, 143, 117, 95/118; 96/108, 134, 135, 139, 153, 154; 55/385.1, 385.6, 512, 514, 524

(56) References Cited

U.S. PATENT DOCUMENTS

| | | | | |
|---|---|---|---|---|
| 2,196,021 A | * | 4/1940 | Merrill | 96/118 |
| 2,214,925 A | * | 9/1940 | Gutrie | 96/134 |
| 2,389,435 A | * | 11/1945 | Karsltrom | 55/514 |
| 2,603,308 A | * | 7/1952 | McCall | 55/512 X |
| 3,025,233 A | * | 3/1962 | Figert | 96/153 X |
| 3,091,550 A | * | 5/1963 | Doying | 96/153 X |
| 3,474,600 A | * | 10/1969 | Tobias | 55/524 |
| 3,545,622 A | * | 12/1970 | Sakhnovsky et al. | 96/153 X |
| 3,645,072 A | * | 2/1972 | Clapham | 96/153 |
| 3,820,309 A | * | 6/1974 | Cullen et al. | 96/151 |

(List continued on next page.)

FOREIGN PATENT DOCUMENTS

| | | | |
|---|---|---|---|
| EP | 0427490 A2 | * | 5/1991 |
| EP | 0458528 A1 | * | 11/1991 |
| GB | 2126123 | * | 3/1984 |
| JP | 62-007415 | * | 1/1987 |
| JP | 62-026899 | * | 2/1987 |
| JP | 02-198631 | * | 7/1990 |
| JP | 05-154329 | * | 6/1993 |
| WO | WO 96/06669 | * | 3/1996 |
| WO | WO 96/14136 | * | 5/1996 |
| WO | WO 97/00717 | * | 1/1997 |
| WO | WO 97/37756 | * | 10/1997 |

*Primary Examiner*—Robert H. Spitzer
(74) *Attorney, Agent, or Firm*—Merchant & Gould P.C.

(57) ABSTRACT

A filter assembly includes a shaped adsorbent article disposed in a housing. The shaped adsorbent article has one or more projections extending from a surface of the article toward the housing to provide for flow of fluid between the shaped adsorbent article and the housing. The filter assembly may optionally include a diffusion channel for additional filtering and/or one or more porous polymer films disposed over inlet or outlet openings in the housing to reduce or prevent particulate contamination. The filter assembly may be used in a device, such as a computer disk drive, to filter a fluid, such as air, within and/or entering or exiting the device.

13 Claims, 5 Drawing Sheets

U.S. PATENT DOCUMENTS

| | | | |
|---|---|---|---|
| 3,911,080 A | * 10/1975 | Mehl et al. ................. 96/134 X |
| 3,918,578 A | * 11/1975 | Cullen et al. ................ 206/204 |
| 3,919,369 A | * 11/1975 | Holden ..................... 96/153 X |
| 3,953,566 A | * 4/1976 | Gore ......................... 264/288 |
| 3,990,872 A | * 11/1976 | Cullen ..................... 96/135 X |
| 4,110,392 A | * 8/1978 | Yamazaki ................... 264/127 |
| 4,178,161 A | * 12/1979 | Rudner et al. ................. 55/524 |
| 4,181,513 A | * 1/1980 | Fukuda et al. ................. 96/153 |
| 4,187,390 A | * 2/1980 | Gore ..................... 174/102 R |
| 4,194,225 A | * 3/1980 | Hasler ......................... 360/98 |
| 4,208,194 A | * 6/1980 | Nelson ........................... 96/4 |
| 4,208,371 A | * 6/1980 | Kring ........................ 96/10 X |
| 4,217,386 A | * 8/1980 | Arons ..................... 96/154 X |
| 4,250,172 A | * 2/1981 | Mutzenberg et al. ...... 96/154 X |
| 4,251,239 A | * 2/1981 | Clyde et al. .............. 55/523 X |
| 4,272,264 A | * 6/1981 | Cullen et al. ................. 96/147 |
| 4,308,041 A | * 12/1981 | Ellis et al. .................... 55/510 |
| 4,332,845 A | * 6/1982 | Nawata et al. .............. 428/135 |
| 4,418,369 A | * 11/1983 | Applequist et al. ........... 360/98 |
| 4,453,955 A | * 6/1984 | Cullen et al. ................. 96/150 |
| 4,471,395 A | * 9/1984 | Beck et al. .................... 360/98 |
| 4,489,356 A | * 12/1984 | Farmer ........................ 360/97 |
| 4,510,193 A | * 4/1985 | Blucher et al. ........... 55/524 X |
| 4,518,704 A | * 5/1985 | Okabayashi et al. ...... 96/153 X |
| 4,581,668 A | * 4/1986 | Campbell ..................... 360/97 |
| 4,594,626 A | * 6/1986 | Frangesh ..................... 360/97 |
| 4,600,420 A | * 7/1986 | Wydeven et al. ............. 55/501 |
| 4,633,349 A | * 12/1986 | Beck et al. .................... 360/97 |
| 4,636,891 A | * 1/1987 | Barski ......................... 360/97 |
| 4,642,715 A | * 2/1987 | Ende ........................... 360/97 |
| 4,657,570 A | * 4/1987 | Gronholz et al. ......... 55/501 X |
| 4,684,510 A | * 8/1987 | Harkins ..................... 95/129 X |
| 4,725,904 A | * 2/1988 | Dalziel ......................... 360/97 |
| 4,748,069 A | * 5/1988 | Cullen ......................... 428/195 |
| 4,751,594 A | * 6/1988 | Blanks ......................... 360/97 |
| 4,772,300 A | * 9/1988 | Cullen et al. ............. 96/134 X |
| 4,777,549 A | * 10/1988 | Dushkes et al. .............. 360/97 |
| 4,813,791 A | * 3/1989 | Cullen et al. ............... 383/140 |
| 4,816,328 A | * 3/1989 | Saville et al.. .............. 428/246 |
| 4,830,643 A | * 5/1989 | Sassa et al. .................... 96/108 |
| 4,857,087 A | * 8/1989 | Bolton et al. .............. 55/385.6 |
| 4,863,499 A | * 9/1989 | Osendorf ..................... 96/134 |
| 4,877,433 A | * 10/1989 | Oshitari ........................ 55/486 |
| 4,880,448 A | * 11/1989 | Scherrer ........................ 96/17 |
| 4,885,652 A | * 12/1989 | Leonard et al. ............. 360/133 |
| 4,889,542 A | * 12/1989 | Hayes ................... 55/385.4 X |
| 4,902,423 A | * 2/1990 | Bacino ................. 210/500.36 |
| 4,911,739 A | * 3/1990 | Cullen et al. .................. 96/133 |
| 4,947,957 A | * 8/1990 | Cullen et al. ................ 181/258 |
| 4,957,518 A | * 9/1990 | Brassell ..................... 96/139 X |
| 4,957,522 A | * 9/1990 | Brassell ..................... 96/134 X |
| 4,981,501 A | * 1/1991 | Von Blucher et al. ........ 96/153 |
| 4,988,903 A | * 1/1991 | Koriyama ..................... 310/12 |
| 4,992,084 A | * 2/1991 | Von Bluchen et al. ..... 96/153 X |
| 4,992,410 A | * 2/1991 | Cullen et al. ................ 502/407 |
| 5,005,763 A | * 4/1991 | Cullen et al. .................. 239/57 |
| 5,009,308 A | * 4/1991 | Cullen et al. ............. 96/154 X |
| 5,025,336 A | * 6/1991 | Morehouse et al. ...... 360/97.02 |
| 5,029,026 A | * 7/1991 | Stefansky et al. ........ 360/97.02 |
| 5,030,260 A | * 7/1991 | Beck et al. ..................... 96/139 |
| 5,033,465 A | * 7/1991 | Braun et al. .............. 55/524 X |
| 5,034,835 A | * 7/1991 | Yokoyama ............... 360/97.02 |
| 5,069,694 A | * 12/1991 | Cullen et al. ............. 96/154 X |
| 5,075,807 A | * 12/1991 | Inoue et al. ............. 360/97.02 |
| 5,081,551 A | * 1/1992 | Aruga ..................... 360/97.01 |
| 5,092,914 A | * 3/1992 | Cullen et al. .................. 96/134 |
| 5,096,473 A | * 3/1992 | Sassa et al. ..................... 95/282 |
| 5,124,856 A | * 6/1992 | Brown et al. ............. 96/135 X |
| 5,148,337 A | * 9/1992 | Cullen et al. ............. 360/97.04 |
| 5,191,721 A | * 3/1993 | Incorvia et al. ................ 34/1 P |
| 5,207,943 A | * 5/1993 | Cullen et al. ........... 252/188.28 |
| 5,215,724 A | * 6/1993 | Haerle ....................... 55/523 X |
| 5,262,375 A | * 11/1993 | McKedy ..................... 502/406 |
| 5,308,665 A | * 5/1994 | Sadek et al. ................ 428/35.2 |
| 5,322,701 A | * 6/1994 | Cullen et al. ................ 426/124 |
| 5,332,426 A | * 7/1994 | Tang et al. .................... 96/153 |
| 5,367,417 A | * 11/1994 | Brown et al. .......... 55/385.6 X |
| 5,406,431 A | * 4/1995 | Beecroft .................. 360/97.02 |
| 5,417,743 A | * 5/1995 | Dauber ........................... 96/13 |
| 5,443,626 A | * 8/1995 | Kiyani ......................... 96/108 |
| 5,447,695 A | * 9/1995 | Brown et al. ............ 360/97.02 |
| 5,500,038 A | * 3/1996 | Dauber et al. ................. 96/135 |
| 5,503,662 A | * 4/1996 | Berger ........................... 96/108 |
| 5,538,545 A | * 7/1996 | Dauber et al. ................. 96/153 |
| 5,593,482 A | * 1/1997 | Dauber et al. ................. 96/135 |
| 5,609,761 A | * 3/1997 | Franz ....................... 55/524 X |
| 5,734,521 A | * 3/1998 | Fukudome et al. .... 55/385.6 X |
| 5,869,009 A | * 2/1999 | Bellefeuille et al. ....... 96/153 X |
| 5,871,569 A | * 2/1999 | Oehler et al. .................. 96/153 |
| 5,876,487 A | * 3/1999 | Dahlgren et al. ............... 96/13 |
| 5,997,618 A | * 12/1999 | Schneider et al. ......... 96/154 X |
| 6,146,446 A | * 11/2000 | Tuma et al. .................... 95/90 |
| 6,168,651 B1 | * 1/2001 | Tuma et al. .................... 95/90 |

* cited by examiner

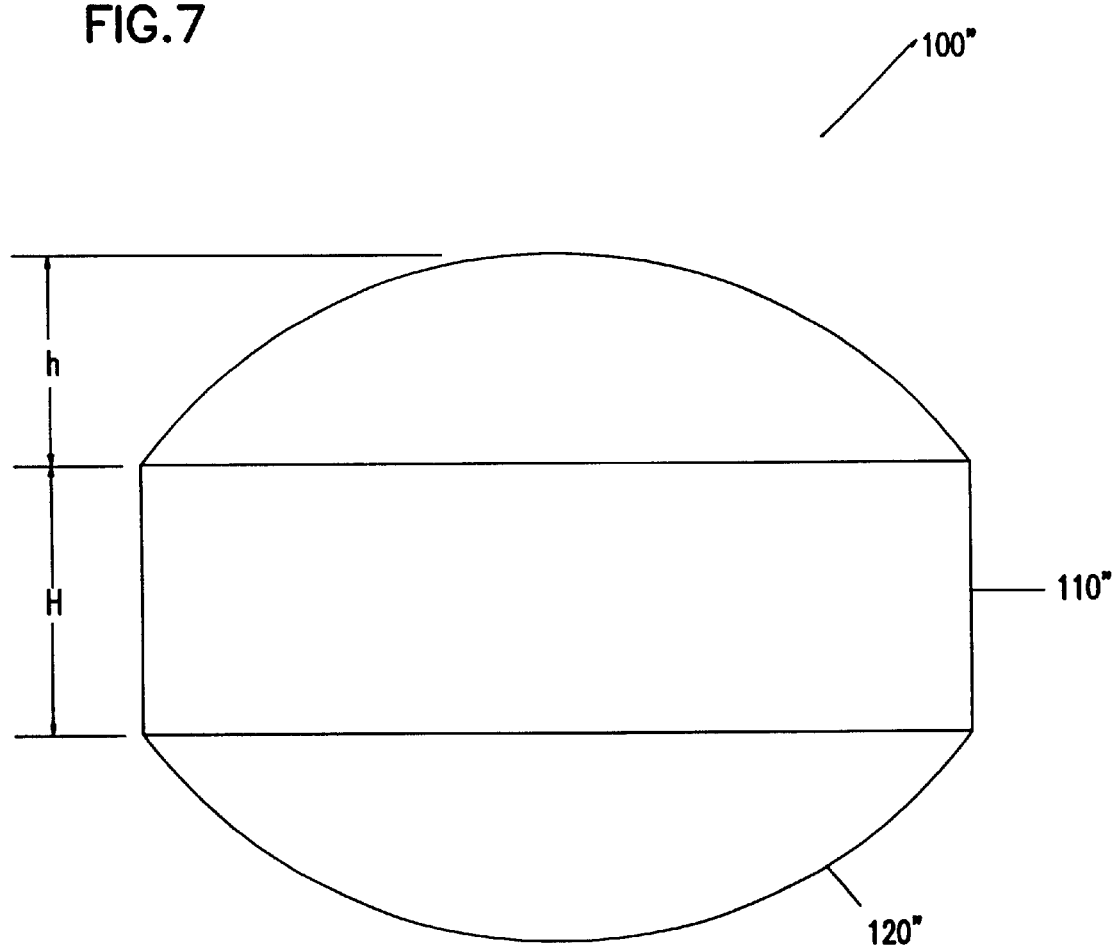

FILTER ASSEMBLY WITH SHAPED ADSORBENT ARTICLE; AND DEVICES AND METHODS OF USE

CROSS REFERENCE TO RELATED APPLICATIONS

This application is a continuation of application Ser. No. 09/353,506, filed Jul. 14, 1999, now U.S. Pat. No. 6,168,651 which is a continuation-in-part of application Ser. No. 09/168,698, filed Oct. 8, 1998, now U.S. Pat. No. 6,146,446, which application(s) are incorporated herein by reference.

FIELD OF THE INVENTION

This invention relates to shaped adsorbent articles, filters utilizing the articles, and methods and assemblies of use. In particular, the invention relates to shaped adsorbent articles having projections extending from a main body of the article, filters utilizing the articles, and methods of use.

BACKGROUND OF THE INVENTION

Adsorbent filters have a variety of uses, including uses in electronic equipment and chemical manufacturing and storage. For example, in the computer industry, adsorbent filters are used within the housings or casings of electronic devices to protect the electronic components from contaminants, such as water vapor, acid gas, and volatile organic compounds. For example, disk drives often include adsorbent filters within the disk drive and/or provided over an opening in the disk drive housing to protect the drive components and the disks from contaminants, such as water vapor, hydrocarbons, and/or acid gas. Without such protection, these contaminants can lead to stiction, corrosion, and, in some instances, drive failure.

Typically, the adsorbent filter includes an adsorbent material, such as activated carbon or a desiccant, within the filter. In many conventional filters, the adsorbent material is typically provided as loose granular filter material or as filter material disposed on a polymer carrier. The presence of granular adsorbent material can produce particulate contamination, particularly if a covering around the filter material is cut or torn open. The addition of a polymer carrier reduces the density of the adsorbent material because of the presence of the carrier and/or air pockets in the adsorbent material. In addition, the polymer carrier/adsorbent material is typically punched or otherwise cut to form the desired shape, often loosening particles from the carrier which can then become contaminants. Compression molded adsorbents are described, for example, in U.S. patent application Ser. No. 08/819,851 now U.S. Pat. No. 5,876,487. However, compression molded adsorbents may, at least in some instances, provide obstruction to fluid flow and thereby substantially increase the pressure drop over a filter. Thus, there is a need for new materials and designs of adsorbent filters to increase filter efficiency and/or to prevent or reduce contamination by the adsorbent material itself.

SUMMARY OF THE INVENTION

Generally, the present invention relates to shaped adsorbent articles for use in adsorbent filters. In particular, the present invention includes articles, assemblies, and methods of use that have or use a shaped adsorbent article having at least one projection extending from a surface of the article to permit fluid flow, e.g., air flow, between a filter housing and the shaped adsorbent article. In some instances, the shaped adsorbent article is a molded or compression molded adsorbent article.

For example, a filter assembly may include a housing and a shaped adsorbent article disposed in the housing. The housing defines an internal volume and has first and second openings for flow of a fluid, such as air, into and out of the internal volume. The shaped adsorbent article has a plurality of projections extending from at least one surface of the article toward the housing to provide for flow of fluid between the shaped adsorbent article and the housing. The filter assembly may be used in a device, such as a computer disk drive, to filter air within and/or entering or exiting the device.

Another example is an adsorbent filter assembly having a housing, a diffusion channel defined in the housing, and a molded adsorbent article. The housing defines an internal volume and includes a first opening and a second opening with the diffusion channel extending from the first opening to the internal volume of the housing. The molded adsorbent article is disposed within the internal volume of the housing and has at least one surface with a plurality of projections extending from the surface toward the housing to provide for fluid flow between the article and the housing. In some instances, the assembly also includes a porous film disposed over the second opening and/or adhesive disposed on the housing to adhere the housing to a device, such as a computer disk drive.

Another example is an adsorbent filter assembly as described above, except the molded adsorbent article has a single projection extending from the surface toward the housing to provide for fluid flow between the article and the housing. The single projection may be centrally positioned on the surface of the molded adsorbent article, and may extend or expand over the entire surface. A single such projection may be disposed on each of two opposite surfaces of the molded adsorbent article.

Yet another example is a method of filtering a fluid. A fluid, such as air, flows through an inlet opening in a housing of a filter assembly. The fluid then flows across a shaped adsorbent article disposed within the housing. The shaped adsorbent article has at least one projection extending from at least one surface of the article to direct fluid flow between the projections and between the shaped adsorbent article and the housing. This method can be used to protect a computer disk drive from contaminants.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 7 is a schematic side view of another shaped adsorbent article according to the invention.

DETAILED DESCRIPTION OF THE PREFERRED EMBODIMENT

The present invention is believed to be applicable to adsorbent articles and assemblies and methods of use of adsorbent articles. In particular, the present invention is directed to assemblies, such as adsorbent filters, that include a shaped adsorbent article to remove contaminants and to methods of using these assemblies. The terms "adsorb", "adsorbing", "adsorbent", and the like are to be understood to encompass both adsorption and absorption phenomena and materials. Although other fluids may be filtered by the filter assembly, the filtration of contaminants from air will be used as an illustration. While the present invention is not so limited, an appreciation of various aspects of the invention will be gained through a discussion of the examples provided below.

Figure 1A:
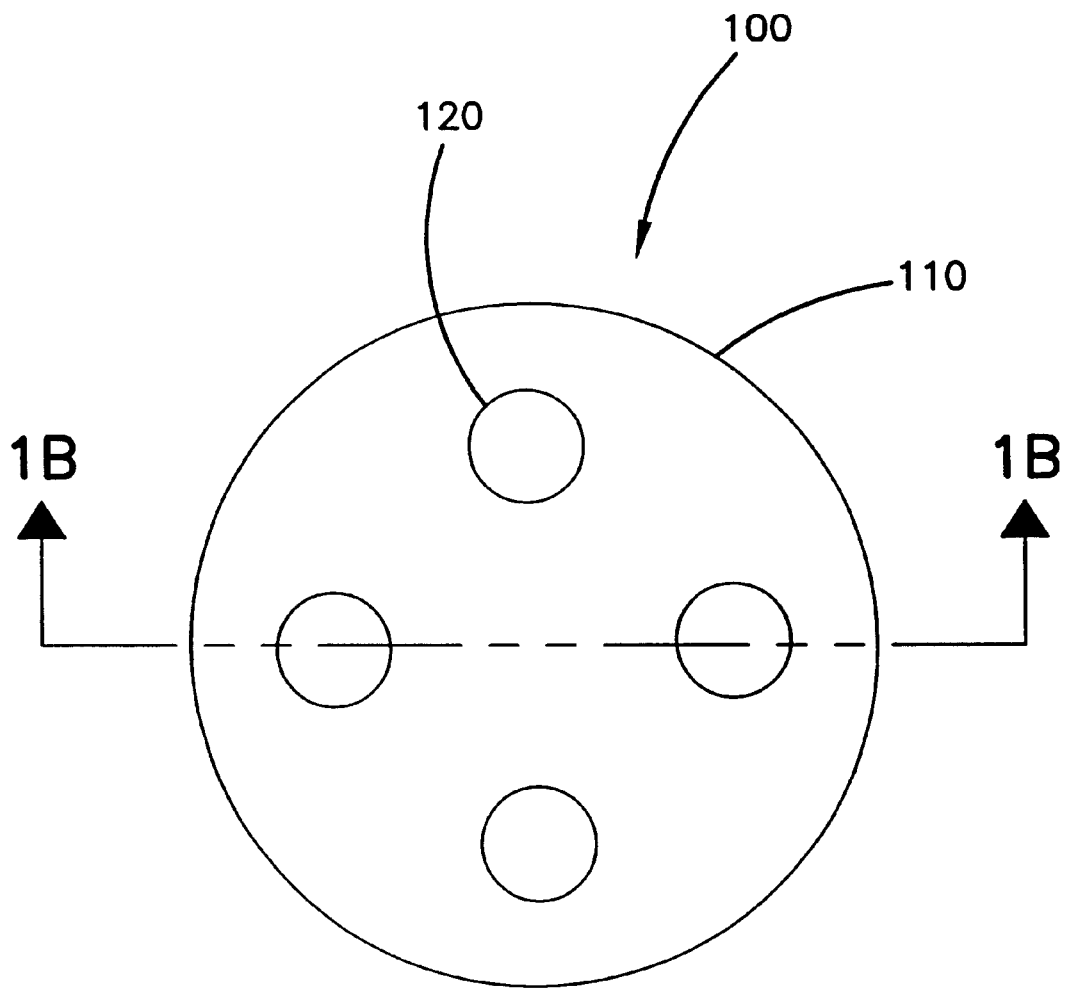
FIG. 1A is a schematic top view of one example of a shaped adsorbent article according to the invention.
Figure 1B:
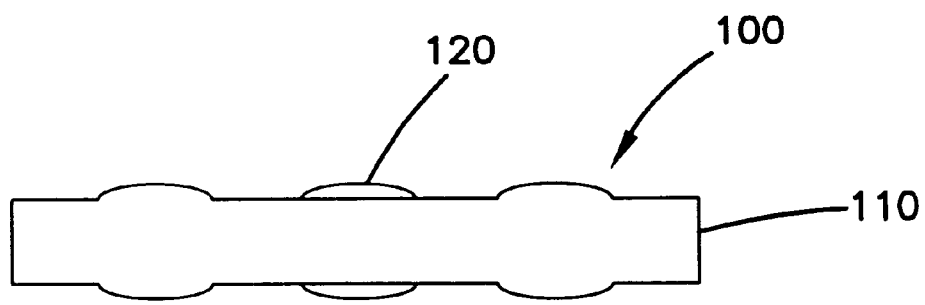
FIG. 1B is a schematic cross-sectional side view of the shaped adsorbent article of FIG. 1A.
Figure 2A:
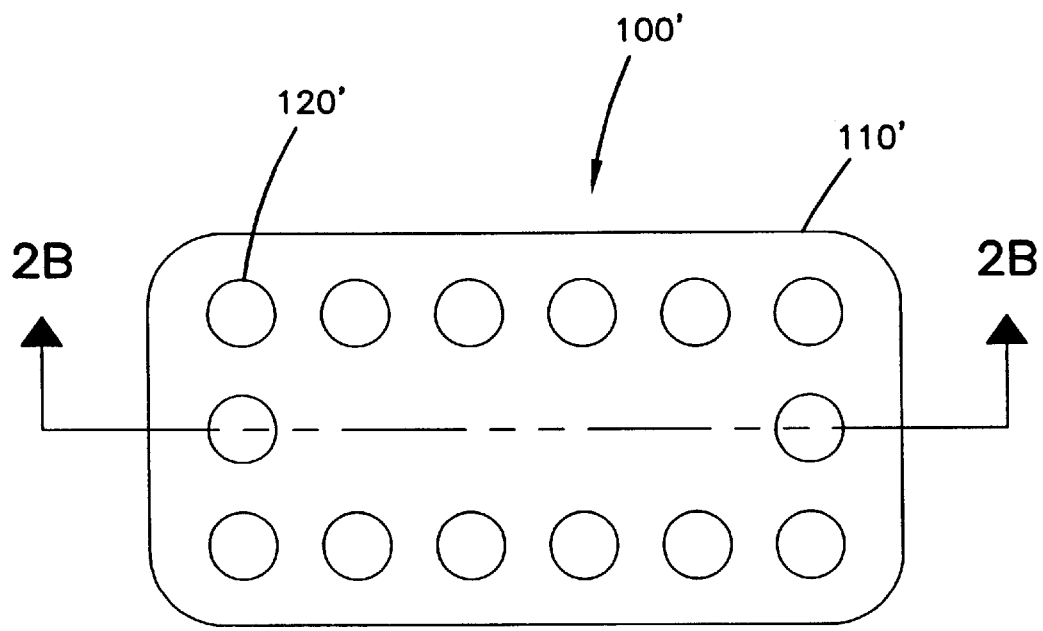
FIG. 2A is a schematic top view of another example of a shaped adsorbent article according to the invention.
Figure 2B:
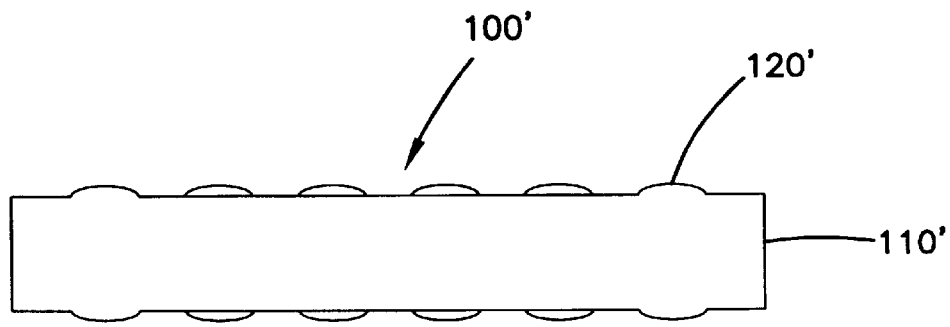
FIG. 2B is a schematic cross-sectional side view of the shaped adsorbent article of FIG. 2A.

FIGS. 1A and 1B are schematic top and cross-sectional side views, respectively, of one embodiment of a shaped adsorbent article 100 and FIGS. 2A and 2B are schematic top and cross-sectional side views, respectively, of a second embodiment of a shaped adsorbent article 100'. The adsorbent article 100, 100' includes a main body 110, 110' with at least one projection 120, 120' extending from a surface of the main body 110, 110'. Typically, the projections 120, 120' are formed (e.g., molded or compression molded) simultaneously with the adsorbent article 100, 100'.

The main body 110, 110' (i.e., the body of the shaped adsorbent article without the projections) can have a variety of shapes. For example, the main body 110, 110' may be shaped as a disk (e.g., FIGS. 1A and 1B), a tablet, a wafer, a cylinder, a parallelepiped (e.g., FIGS. 2A and 2B), or a cube. The size of the shaped adsorbent article 100, 100' typically depends on factors such as the size of the device in which the shaped adsorbent article is to be used, the volume of fluid to be filtered, the expected lifetime of the filter assembly, and the density of the shaped adsorbent article.

The main body 110, 110' of the shaped adsorbent article 100, 100' includes at least one projection 120, 120' extending from at least one surface of the main body. Typically, the shaped adsorbent article 100, 100' includes at least four and often six or more projections 120, 120' on at least one surface of the main body 110, 110'. In some instances, projections 120, 120' are provided on two surfaces of the main body, for example, on two opposing surfaces, as illustrated, for example, in FIGS. 1B and 2B. The projections 120, 120' may be distributed uniformly, according to a pattern, or randomly on a surface of the main body 110, 110'. In some instances, all of the projections 120, 120' are provided around a peripheral edge of the main body 110, 110', as illustrated, for example, in FIG. 2B.

In the embodiment shown in FIG. 7, the main body 110" of the shaped adsorbent article 100" includes only one projection 120" extending from at least one surface of the main body 110". In some instances, a projection 120" may be provided on each of two surfaces of the main body, for example, on two opposing surfaces, as illustrated, for example, in FIG. 7. The projection 120" may be sized so as to extend from the entire surface of the main body; that is, the projection 120" may occupy the entire surface. In some embodiments, the single projection 120" on each of one or two surfaces gives those surfaces a domed (e.g., hemispherical) shape.

The projections 120, 120', 120" can have a variety of shapes. For example, the projections can be hemispheres, cylinders, cones, truncated cones, cubes, parallelepipeds, or other geometrically regular or irregular shapes. All of the projections 120, 120', 120" on a shaped adsorbent article 100, 100', 100" may have the sane shape or there may be two or more types of differently shaped projections 120, 120', 120" on an article 100, 100', 100". The cross-sectional dimensions (e.g., length, width, and/or diameter) of the projections 120, 120', 120" may depend on factors, such as, for example, the size of the shaped adsorbent article, the size of the surface from which the projections extend, the number of projections, and the desired amount of filtering. The distance separating the projections may depend on the density of the projections on the surface, the size of the surface, the size and shape of the projections, and the arrangement of the projections. If a single projection 120" is present on a surface, the projection 120" may occupy the entire surface area.

The distance that the projections 120,120', 120" extend from the main body 110, 110', 110" can vary over a wide range. The distance is typically large enough to allow a fluid, such as air, to flow between the projections 120, 120', 120", yet still make sufficient contact with the main body 110, 110', 110" and projections 120, 120', 120" to produce a desired amount of filtering.

The projections 120, 120', 120" define, at least in part, a path for flow of air (or another fluid) between a filter assembly housing (not shown) and the main body 110, 110', 110" of the shaped adsorbent article 100, 100', 100". The path defined at least in part by the projections 120, 120', 120" is typically around and/or between the projections 120, 120', 120". This configuration allows air to flow more freely through the filter assembly as compared to using a shaped adsorbent article without projections.

Air, as well as contaminants carried by air, are in contact with the surface of the shaped adsorbent article 100, 100', 100". This permits the shaped adsorbent article 100, 100', 100" to filter the air by adsorbing contaminants. It is thought, although not necessary to the invention, that most of the air does not travel through the shaped adsorbent article, but rather around the article. It is also thought that the contaminants are adsorbed on the surface of the shaped adsorbent article and then diffuse into the interior of the article.

In addition to providing a path for fluid flow around the shaped adsorbent article 100, 100', 100" the projections 120, 120', 120" may also provide an increased surface area for interaction with the fluid. The increase in surface area is typically related to factors, such as, for example, the number of projections, their cross-sectional area, the distance the projections extend from the main body, and the shape of the projections. The projections 120, 120', 120" may also provide obstacles to the direct flow of air over the surface of the shaped adsorbent article and may redirect air flow (e.g., by producing eddy currents) toward that surface, thereby increasing filter efficiency.

A single projection 120" on the surface of the shaped adsorbent article 100" increases the surface area available for interaction with the fluid in relation to the surface area available if no projection were present. Likewise, a single projection 120" on each of two opposite surfaces of the shaped adsorbent article 100" further increase the surface area available.

In another embodiment, a projection, or a plurality of projections, may be positioned on a first projection on an adsorbent article. For example, projections 120, such as illustrated in FIGS. 1A and 1B, may be positioned on projection 120" of adsorbent article 100" shown in FIG. 7. These multiple layers of projections may provide an advantage of increased air flow across the shaped adsorbent article.

The shaped adsorbent article 100, 100', 100" is typically formed of a material that can be easily formed into a shape that the material retains over time, often, following a curing (e.g., heating) or other process to set the material in the shape. The term "shaped" means that the adsorbent article is formed into a shape that the article substantially retains during the normal or expected lifetime of a filter assembly. The shaped adsorbent article may be formed from a free-flowing particulate material that is shaped into a non-free-flowing article. The shaped adsorbent article may be formed by a molding, preferably, a compression molding, process. These particular processes can be used to form the shaped adsorbent article in a variety of shapes with reproducible projections.

The shaped adsorbent article is not a conglomerate of granular particles that are held together by an outer skin or cover, but is typically a structure that retains its shape without external support. However, it will be understood that application of force may break or otherwise dislodge portions of the article. The shaped adsorbent article may provide advantages over conventional filters including, adsorbent filters formed by depositing an adsorbent material on a carrier film or granular adsorbent material provided in a porous container or covering. The shaped adsorbent article can often be formed with a density of adsorbent material that is significantly greater, often at least 1.5 to two times greater, than these conventional filters. This is particularly useful as devices, such as disk drives, become smaller and the need for filtration becomes greater. Moreover, the possibility of particulate contamination by the filter itself may be greater when using the conventional granular or adsorbent/carrier configurations, as opposed to using a shaped adsorbent article. Furthermore, the addition of projections typically permits better flow of air (i.e., a lower pressure drop) through the filter assembly than would be available using a shaped adsorbent article without projections.

At least a portion of the material used in the shaped adsorbent article has adsorbent properties. The shaped adsorbent article is often formed using an adsorbent material and a binder. The adsorbent material can include physisorbents and/or chemisorbents, such as desiccants (i.e., materials that adsorb or absorb water or water vapor) and/or materials that adsorb volatile organic compounds and/or acid gas. Suitable adsorbent materials include, for example, activated carbon, activated alumina, molecular sieves, silica gel, potassium permanganate, calcium carbonate, potassium carbonate, sodium carbonate, calcium sulfate, or mixtures thereof. The adsorbent material may adsorb one or more types of contaminants, including, for example, water, water vapor, acid gas, and volatile organic compounds. Although the adsorbent material may be a single material, mixtures of materials are also useful.

For typical operation, an adsorbent material that is stable and adsorbs within a temperature range of −40° C. to 100° C. is preferred. Preferably, the adsorbent material is a powder (passes through 100 mesh U.S.S.) or granular material (28 to 200 mesh) prior to forming the shaped adsorbent article.

The binder is typically dry, powdered, and/or granular and can be mixed with the adsorbent. In some embodiments, the binder and adsorbent material are mixed using a temporary liquid binder and then dried. Typically, a binder is used that does not completely coat the adsorbent material. Suitable binders include, for example, microcrystalline cellulose, polyvinyl alcohol, starch, carboxyl methyl cellulose, polyvinylpyrrolidone, dicalcium phosphate dihydrate, and sodium silicate.

Preferably the composition of the shaped adsorbent article includes at least about 70%, by weight, and typically not more than about 98%, by weight, adsorbent. In some instances, the shaped adsorbent article includes 85 to 95%, preferably, approximately 90%, by weight, adsorbent. The shaped adsorbent article typically includes not less than about 2%, by weight, binder and not more than about 30%, by weight, binder. In some instances, the shaped adsorbent article includes about 5 to 15%, and, preferably, about 10%, by weight, binder.

In some instances, it may be desirable to include a small amount of lubricant such as PTFE (Teflon® powder) within the composition, in order to facilitate mold release. When such is used, preferably no more than about 10%, and more preferably less than about 3% of the composition, comprises added lubricant. If a lubricant is used, preferably a minimum amount effective to accomplish a desirably reproducible mold release, is used.

The shaped adsorbent article can be formed using a variety of compression molding or tablet-forming techniques. Generally all that is required is sufficient pressure and/or heat to ensure brick integrity under ordinary handling and manufacturing conditions. A compression such that a given volume contains about 0.8 to 1.75 times (preferably 1 to 1.75 times, most preferably greater than 1 time), by weight, adsorbent by comparison to the amount of adsorbent that would occupy the same volume if it were left in a granular, free-flowing state, is generally adequate and desirable. To accomplish this, such techniques as conventional tabletting are readily adaptable. Generally tabletting pressures on the order of 12,700 to 25,500 psi will suffice. It may be possible to use lower pressures by optimizing the formulation, or modifying the binder, for any selected application and geometry. In addition to pressure, heat may be used to set the binder. The amount of heat may depend on the binder and/or adsorbent material.

Preferably, for typical uses in electronic components, an overall bulk volume for the compression molded item within the range of about 0.008 to 262 cm$^3$ will be preferred, more typically 0.26 to 18 cm$^3$. In this context, the term "bulk volume" is meant to refer to the volume calculated from either the compression mold cell or the outside dimensions to the resulting compression molded product.

Figure 3:
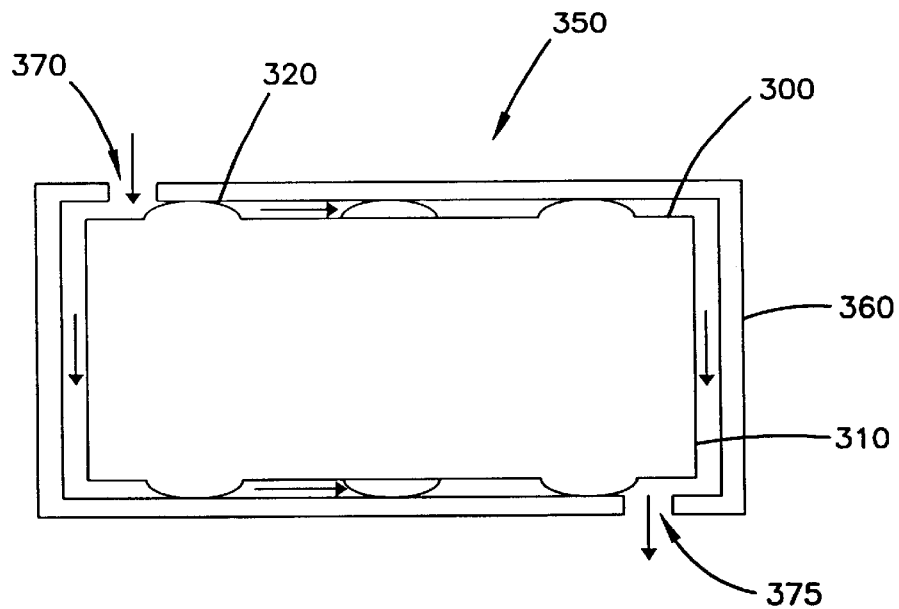
FIG. 3 is a schematic cross-sectional side view of one example of a filter assembly having a shaped adsorbent article according to the invention.

FIG. 3 illustrates one example of the disposition of a shaped adsorbent article 300 in a filter assembly 350. Although only one shaped adsorbent article is illustrated, it will be understood that, in some instances, more than one shaped adsorbent article (e.g., one shaped adsorbent article containing activated carbon and another article containing a desiccant) may be used. The filter assembly 350 includes a housing 360 with an inlet opening 370 and an outlet opening 375. As illustrated, the projections 320 on the surface of the shaped adsorbent article 300 extend outward from a surface of the main body 310 of the article 300 toward the housing 360. Although this example is described with respect to air flowing through the inlet opening 370 into an internal volume of the housing 360 and then through the outlet opening 375, it will be understood that air may also flow in the opposite direction.

The housing 360 may be, for example, an outer covering, a casing, or a shell. The housing 360 is typically formed from a plastic material, such as, for example, polycarbonate, polyvinyl chloride, nylon, polyethylene, polypropylene, or polyethylene terephthalate (PETG). The housing 360 may be a single piece or, alternatively, the housing may be formed as two or more pieces that are combined together using, for example, an adhesive, mechanical connectors, heat sealing, and/or ultrasonic welding to form, for example, a perimeter seal. In other embodiments, the housing 360 may be a porous polymer film or pouch around the shaped adsorbent article and formed from, for example, polyethylene, polypropylene, polytetrafluoroethylene, or expanded polytetrafluoroethylene. In these embodiments, an inlet opening and/or outlet opening may be unnecessary as the film or pouch is porous.

Optionally, a porous filter layer (not shown) may be provided over the inlet opening and/or outlet opening. The porous filter layer may include a porous polymer film, such as, for example, a porous polyethylene, polypropylene, polytetrafluoroethylene, or expanded polytetrafluoroethylene film. The porous filter layer may also include a woven or nonwoven scrim or support layer to support the porous polymer film. This porous filter layer may be particularly useful to prevent particulate matter from entering and/or exiting the inner volume of the housing.

A surface of the housing may be coated with an adhesive (not shown) to attach the filter assembly to a wall of a device, such as, for example, a computer disk drive. In particular, the adhesive may be coated or applied on the surface of the housing having the inlet opening or outlet opening so that the filter assembly can be placed over an inlet or outlet port in a housing of the device. In addition, an interior surface of the housing may be coated with adhesive to adhere the shaped adsorbent article to the housing. The adhesive on an exterior and/or interior surface of the housing may be, for example, a single layer of an adhesive material or a carrier film with adhesive on two opposing sides (e.g., a double-sided adhesive tape).

Figure 4:
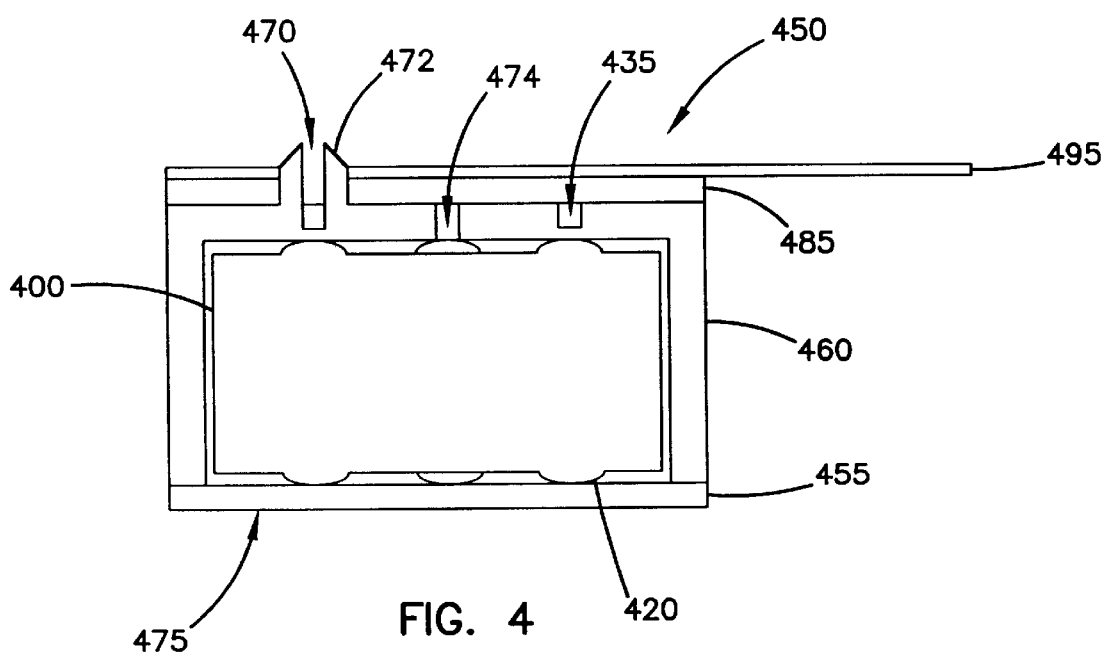
FIG. 4 is a schematic cross-sectional side view of another example of a filter assembly having a shaped adsorbent article according to the invention.

FIG. 4 illustrates another example of a filter assembly 450. The filter assembly 450 includes a shaped adsorbent article 400 with projections 420 extending from at least one surface of the article 400. The shaped adsorbent article 400 is disposed within a housing 460 that has an inlet opening 470 and an outlet opening 475. A filter layer 455 is disposed over the outlet opening 475. The inlet opening 470 is formed using an optional extension 472 from the housing 460 that can be positioned within a port, such as an inlet or outlet port, in a device housing to filter air entering or exiting the housing. In addition, an adhesive layer 485 is provided on the surface of the housing containing the inlet opening 470. An optional release liner 495 may be provided over the adhesive layer 485 and removed when the filter assembly is to be attached at a desired location in the device (e.g., computer disk drive) housing.

Figure 5A:
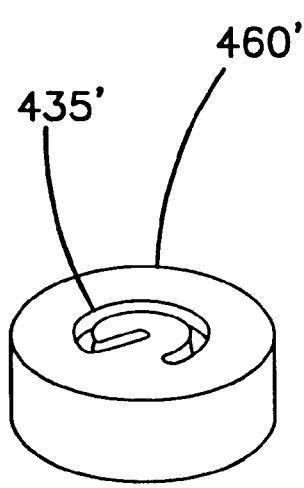
FIG. 5A is a schematic top perspective view of one example of a filter housing for use with a shaped adsorbent article according to the invention.
Figure 5B:
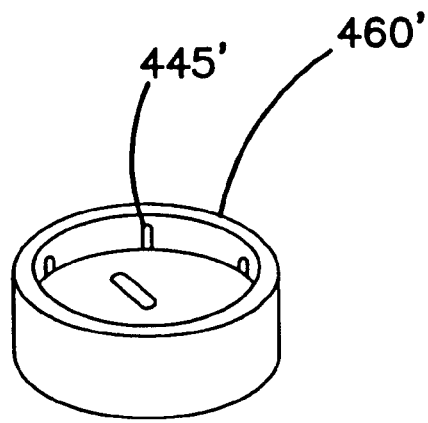
FIG. 5B is a schematic bottom perspective view of the filter housing of FIG. 5A.
Figure 6A:
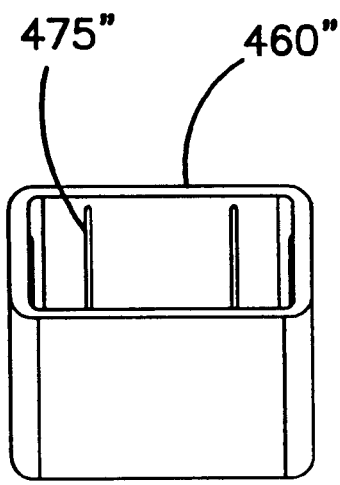
FIG. 6A is a schematic top perspective view of one example of a filter housing for use with a shaped adsorbent article according to the invention.
Figure 6B:
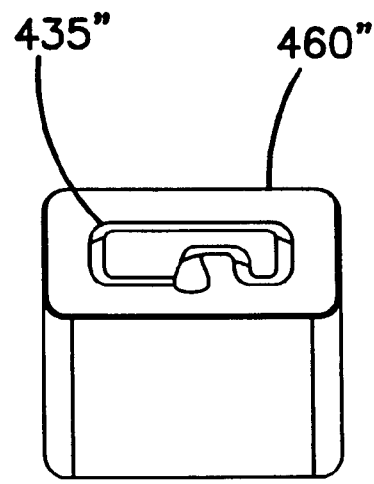
FIG. 6B is a schematic bottom perspective view of the filter housing of FIG. 6A.

The housing 460 is typically formed to hold an appropriately sized and shaped adsorbent article. FIGS. 5A and 5B illustrate one embodiment of a housing 460' for use with, for example, a disk-shaped adsorbent article, such as the article 100 illustrated in FIGS. 1A and 1B. FIGS. 6A and 6B illustrate another embodiment of a housing 460" for use with, for example, a parallelepiped-shaped adsorbent article, such as the article 100' illustrated in FIGS. 2A and 2B.

The housing 460 is usually formed from a plastic material, such as, for example, polycarbonate, polyvinyl chloride, nylon, polyvinyl pyrrolidone, polyethylene, polypropylene, or polyethylene terephthalate (PETG), although, in some embodiments, porous polymer films or pouches may also be used. The housing 460 is typically formed by molding the housing material into a desired shape, although other methods of forming the housing 460 may also be used. The housing 460 may be a single piece, as illustrated in FIGS. 4, 5A, 5B, 6A, and 6B, or, alternatively, the housing may be formed as two or more pieces that are combined together using, for example, an adhesive, mechanical connectors, heat sealing, and/or ultrasonic welding to form, for example, a perimeter seal.

The housing may optionally include one or more ribbed members 445', 475" along at least one sidewall of the housing, as illustrated in FIGS. 5B and 6A. These ribbed members may be provided to separate the shaped adsorbent article from contact with the sidewall of the housing, particularly for those surfaces of the shaped adsorbent article that are not provided with projections.

An optional diffusion channel 435 may also be formed in the housing 460, as illustrated in FIGS. 4, 5A and 5B (diffusion channel 435'), and 6A and 6B (diffusion channel 435"). The diffusion channel 435 may extend from the inlet opening 470 at the exterior of the housing 460 to an aperture 474 opening on the inner volume of the housing 460. The diffusion channel 435 can have a variety of shapes, as illustrated, for example, in FIGS. 5A and 6B. The channel 435 may be formed with the housing (e.g., molded or compression molded) or may be later formed in the housing by cutting or otherwise removing material from the housing. Alternatively, a separate diffusion channel layer, with a diffusion channel defined therein, may be formed as a separate piece and inserted into the interior of the housing or attached, for example, adhesively, to the exterior of the housing. This separate piece may be, for example, a molded article or a polymer film having a channel formed therein.

The filter layer 455 typically includes a porous polymer film made from, for example, polyethylene, polypropylene, polytetrafluoroethylene, or expanded polytetrafluoroethylene. The filter layer 455 may optionally include a woven or nonwoven scrim or support layer to support the porous polymer film. The outlet opening 475 may range from a relatively small hole in the housing 460 (see, for example, FIG. 3) to include an entire side of the housing 460, as illustrated in FIG. 4. The filter layer 455 typically covers the entire outlet opening 475, but may also extend beyond the outlet opening 475. The filter layer 455 may, for example, prevent particulate material from entering or exiting the interior of the filter assembly 450. Particulate material external to the filter assembly can block pores on the shaped adsorbent article 400, rendering the article less effective. In addition, particulate material from the filter assembly, for example, particulate material shed or broken off the shaped adsorbent article, can further contaminate the device. The filter layer 455 may prevent or reduce these occurrences. The filter layer 455 may optionally remove some contaminants from the fluid.

The adhesive layer 485 may be, for example, a coating of an adhesive material on the housing 460 or a double-sided adhesive tape (e.g., an adhesive carrier, such as a polymer film, with adhesive coated on two opposing surfaces). An opening may be formed in the adhesive layer 485, particularly if the adhesive layer is a double-sided adhesive tape, to permit fluid flow into the inlet opening 470 and/or to fit around the extension 472. The release liner 495 is typically a film, for example, a polymer film, that can be removed from the adhesive layer 485 leaving most, and, preferably, all, of the adhesive layer 485 disposed on the housing 460. The release liner 495 may extend beyond the adhesive layer 485 to allow for easy removal.

Air can flow through the inlet port of the device, into the extension 472 and inlet opening 470, along the diffusion channel 435, and through the aperture 474 to the internal volume of the filter housing 460. The air then flows over the surface of the shaped adsorbent article 400 and between the projections 420, so that contaminants in the air can be adsorbed by the shaped adsorbent article 400. The air then flows through the outlet opening 475 and the filter layer 455 into the device. In addition or alternatively, air within the device can flow through the filter layer 455 and outlet opening 475 and into contact with the shaped adsorbent article 400 to remove contaminants formed within the device.

In an alternative embodiment, an internal surface of the housing may include stand-off projections that separate the shaped adsorbent article from the non-projecting portion of the internal surface. These stand-off projections may be provided on the side, top, or bottom internal surfaces. The shaped adsorbent article may or may not have projections extending from the side that is facing the internal surface with stand-off projections. As an example, the device of FIG. 4 could be modified to have stand-off projections extending from the top internal surface of the housing (i.e., the internal surface from which air exits from the diffusion channel or inlet opening) and the shaped adsorbent article modified to have no projections extending towards the top internal surface with stand-off projections.

Accordingly, a filter assembly can be formed using a shaped adsorbent article with at least one projection extending from the article to provide for flow of a fluid between a main body of the adsorbent article and a housing. This configuration can provide for filtering of the fluid using denser filter material (to reduce volume of the filter, for example) and/or less pressure drop.

EXAMPLES OF SHAPED ADSORBENT ARTICLES

One suitable example of a shaped adsorbent article is a disk, such as the embodiment illustrated in FIGS. 1A and 1B, having a main body with a diameter of at least 2 mm and not more than 20 mm. The diameter of this shaped adsorbent article is typically 3 to 12 mm. This shaped adsorbent article has a thickness of at least 0.5 mm and not more than 8 mm. The thickness is typically 0.7 to 5 mm.

Another example of an adsorbent article is a parallelepiped, such as the embodiment illustrated in FIGS. 2A and 2B, having a main body with length and width dimensions (that are not necessarily the same) of at least 3 mm and not more than 30 mm. The length and width dimensions are typically 8 to 20 mm. The thickness of this shaped adsorbent article is not less than 1 mm and not more than 20 mm. The thickness is typically 4 to 15 mm.

Yet another example of an adsorbent article is a domed article, such as the embodiment illustrated in FIG. 7. A single protrusion 120″ is positioned on each of opposite sides of main body 110″ to provide an adsorbent article 100″ having a domed shape. If the overall shape of the adsorbent article is circular, i.e., a disk, then adsorbent article 100″ may resemble a circular pill. Alternately, the overall shape of the adsorbent article may be a shape other than circular, and may be, for example, rectangular. A domed rectangular adsorbent article 100″ may resemble a caplet.

No matter what the overall shape is of the shaped adsorbent article, the shaped adsorbent article 100″ typically has an overall thickness of at least 0.5 mm and typically not more than 8 mm. The thickness "H" of the main body 110″, as illustrated in FIG. 7, is generally at least 0.35 mm thick and typically not more than about 4 mm. A suitable range for the thickness H of main body 110″ is about 1 mm to about 4 mm. The height or thickness "h" of the protrusion 120″, as illustrated in FIG. 7, is generally at least 0.1 mm and typically not more than 3 mm. A suitable range for the height h of the protrusion 120″ is generally about 0.5 mm to 2 mm.

When multiple projections are used, the projections have a dimension (i.e., length, width, and/or diameter) that is at least 0.2 mm and not more than 5 mm. The length, width, and/or diameter of the projections is typically 0.3 to 2 mm, although the protrusion may cover the entire surface of the main body of the shaped adsorbent article. If multiple projections are positioned on a surface, the nearest distance between any two projections on the same surface is at least 0.2 mm and not more than 5 mm. The nearest distance is typically 0.5 to 3 mm. The projections extend at least 0.05 mm and not more than 1 mm from the surface of the shaped adsorbent article. The projections typically extend 0.1 to 0.5 mm. If multiple projections are positioned on a surface, usually at least about 2% and not more than about 50% of the surface area of a particular surface of the shaped adsorbent article is occupied by the projections. Typically, the projections cover about 5 to 25%, and, preferably, about 7 to 20% of a particular surface. If a single projection is on a surface, such as illustrated in FIG. 7, this one projection may cover about 10 to 100% of the surface, and typically covers about 50 to 100% of the surface. The projections increase the surface area of the shaped adsorbent article that is exposed to the fluid by at least about 1%. Typically, the surface area of a surface is increased by about 1 to 25% or more, preferably by 5 to 20%.

One example of a suitable shaped adsorbent article is made from adsorbent material that includes at least 70%, by weight, activated carbon to filter volatile organic compounds. Preferably, this shaped adsorbent article includes 85 to 100%, by weight, activated carbon. This shaped adsorbent article can include up to 30%, by weight, desiccant or acid gas adsorbent, such as, for example, potassium carbonate or calcium carbonate. Preferably, the shaped adsorbent article includes 1 to 15%, by weight, desiccant or acid gas adsorbent.

Another example of a suitable shaped adsorbent article has adsorbent material that includes at least 75%, by weight, silica gel and up to 25%, by weight, activated carbon. This shaped adsorbent article can include 75% to 100%, preferably, 85% to 95%, by weight, silica gel and 0 to 25%, preferably, 5 to 15%, by weight, activated carbon. In addition, the shaped adsorbent article may include up to 10%, preferably, 1 to 7%, by weight, desiccant or acid gas adsorbent.

In Table I, some usable materials for the shaped adsorbent article are identified.

TABLE I

USABLE MATERIALS FOR SHAPED ADSORBENT ARTICLE

| Component | Function | Supplier(s) and Sample Products |
|---|---|---|
| Silica Gel | Water Vapor Adsorption | Grace Davison (Grade 11 or Syloid 63) Baltimore, MD 21203-2117; Fuji Sylisia (Type A or Type B) Portland, OR 97204 |
| Activated Carbon | Adsorption of organic vapors, hydrocarbons and/or acid gases | Barnebey and Sutcliffe (209C; 209C KINA) Columbus, OH 43216 |
| Potassium Carbonate | Adsorption of acid gases | Aldrich, Milwaukee, WI |
| Sodium Carbonate | Adsorption of acid gases | Aldrich, Milwaukee, WI |
| Microcrystalline Cellulose | Binder | FMC (Lattice NT-050 or NT-006) Philadelphia, PA 19103 |
| Teflon Powder | Lubricant | DuPont (Zonyl MP 1100) Wilmington, DE 19805 |
| Polyvinyl Alcohol | Binder | Air Products (Airvol 203S) Allentown, PA |
| Starch | Binder | ADM (Clineo 718) Clinton, IA |
| Carboxyl Methyl Cellulose | Binder | Hercules (Aqualon 7MX) Wilmington, DE 19894 |
| Polyvinyl pyrrolidone | Binder | GAF Chemicals Corporation (Plasdone) Wayne, NJ 07470 |
| Sodium Silicate | Binder | Aldrich, Milwaukee, WI |
| Dicalcium Phosphate Dihydrate | Binder | Rhone Poulenc (DI-TRB) Shelton, CT |

The shaped adsorbent article can be formed by combining the adsorbent material with a binder. Typically, the shaped adsorbent article includes 70 to 98%, by weight, adsorbent material and 2 to 30%, by weight, binder. One suitable shaped adsorbent article includes about 87%, by weight, activated carbon, about 3%, by weight, potassium carbonate, and about 10%, by weight, polyvinyl pyrrolidone. The adsorbent material and binder can be compression molded using heat and pressures on the order of 12,700 to 25,500 psi to form the shaped adsorbent article with projections. Additional description of materials for the shaped adsorbent article and methods for forming the shaped adsorbent article are described in U.S. Pat. No. 5,876,487, incorporated herein by reference.

In some embodiments, the density of material (e.g., carbon) in the shaped adsorbent article is in the range of 0.35 to 0.7 g/cm$^3$. The density of material in the internal volume of the housing could be in the range of 0.2 to 0.7 g/cm$^3$. In some instances, the pressure drop through the filter may be in the range of 0.25 to 5 cm of water measured at a 30 cm$^3$/min flow rate.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A method of protecting a disk drive from contaminants, the method comprising steps of:
   positioning, within the disk drive, a filter assembly comprising a non-porous plastic filter housing defining an internal volume and having a first opening and a second opening for flow of air into and out of the internal volume, and a compression molded adsorbent article disposed in the filter housing;
   flowing air through an first opening in the housing of the filter assembly; and
   flowing the air across the shaped adsorbent article and between the shaped adsorbent article and the housing, wherein the filter assembly further comprises a diffusion channel between the first opening and the internal volume and the method further comprises flowing air through the diffusion channel and into the internal volume of the filter assembly.

2. The method of claim 1, wherein the diffusion channel extends between the first opening on an exterior of the housing to an aperture that opens into the interior volume of the filter housing, wherein the first opening and aperture do not overlap.

3. The method of claim 1, wherein the diffusion channel forms a curved path from the first opening to the internal volume of the filter housing.

4. A method of protecting a disk drive from contaminants, the method comprising steps of:
   positioning, within the disk drive, a filter assembly comprising a non-porous plastic filter housing defining an internal volume and having a first opening and a second opening for flow of air into and out of the internal volume, and a compression molded adsorbent article disposed in the filter housing;
   flowing air through an first opening in the housing of the filter assembly; and
   flowing the air across the shaped adsorbent article and between the shaped adsorbent article and the housing, wherein the housing further comprises at least one ribbed member extending from a sidewall of the housing and into the internal volume of the housing to separate the shaped adsorbent article from contact with the sidewall of the housing.

5. An assembly comprising:
   (a) a device housing including therein a disk drive to be protected;
   (b) a filter disposed in the device housing and comprising:
      (i) a non-porous plastic filter housing defining an internal volume and having a first opening and a second opening for flow of air into and out of the internal volume, and (ii) a compression molded adsorbent article disposed in the filter housing; and (c) a diffusion channel defined within the filter housing and configured and arranged for air flow from the first opening, through the diffusion channel, and into the internal volume of the filter housing, wherein the housing further comprises at least one ribbed member extending from a sidewall of the housing and into the internal volume of the housing to separate the shaped adsorbent article from contact with the sidewall of the housing.

6. An assembly comprising:

(a) a device housing including therein a disk drive to be protected;

(b) a filter disposed in the device housing and comprising:
(i) a non-porous plastic filter housing defining an internal volume and having a first opening and a second opening for flow of air into and out of the internal volume, and
(ii) a compression molded adsorbent article disposed in the filter housing; and (c) a diffusion channel defined within the filter housing and configured and arranged for air flow from the first opening, through the diffusion channel, and into the internal volume of the filter housing.

7. The assembly of claim 6, wherein the diffusion channel extends between the first opening on an exterior of the housing to an aperture that opens into the interior volume of the filter housing, wherein the first opening and aperture do not overlap.

8. The assembly of claim 6, wherein the diffusion channel forms a curved path from the first opening to the internal volume of the filter housing.

9. The assembly of claim 6, wherein the diffusion channel is molded into the housing.

10. An adsorbent filter assembly, comprising:

(a) a non-porous plastic housing having a first opening and a second opening and defining an internal volume;

(b) a diffusion channel defined within the housing and extending from the first opening to an aperture that opens into the internal volume of the housing, wherein the first opening and the aperture do not overlap; and (c) a compression molded adsorbent article disposed within the internal volume of the housing.

11. The adsorbent filter assembly of claim 10, wherein the diffusion channel forms a curved path from the first opening to the internal volume of the filter housing.

12. The adsorbent filter assembly of claim 10, wherein the diffusion channel is molded into the housing.

13. The adsorbent filter assembly of claim 10, wherein the housing further comprises at least one ribbed member extending from a sidewall of the housing and into the internal volume of the housing to separate the shaped adsorbent article from contact with the sidewall of the housing.

* * * * *